(12) United States Patent
Miyata (10) Patent No.: US 9,694,339 B2
(45) Date of Patent: Jul. 4, 2017

(54) CHEMICAL SYNTHESIS DEVICE AND METHOD FOR MANUFACTURING CHEMICAL SYNTHESIS DEVICE

(71) Applicant: SEIKO EPSON CORPORATION, Tokyo (JP)

(72) Inventor: Takashi Miyata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 14/742,865

(22) Filed: Jun. 18, 2015

(65) Prior Publication Data

US 2015/0375191 A1    Dec. 31, 2015

(30) Foreign Application Priority Data

Jun. 27, 2014  (JP) .................................. 2014-132273
Feb. 19, 2015  (JP) .................................. 2015-030329

(51) Int. Cl.
| | | |
|---|---|---|
| *B01J 19/00* | (2006.01) | |
| *B01J 19/24* | (2006.01) | |
| *B32B 37/00* | (2006.01) | |
| *B32B 37/12* | (2006.01) | |

(Continued)

(52) U.S. Cl.
CPC .. *B01J 19/0093* (2013.01); *B01J 2219/00783* (2013.01); *B01J 2219/00804* (2013.01); *B01J 2219/00824* (2013.01); *B01J 2219/00831* (2013.01); *B01J 2219/00833* (2013.01); *B01J 2219/00842* (2013.01); *B01J 2219/00873* (2013.01); *B01J 2219/00894* (2013.01); *B32B 37/12* (2013.01); *B32B 2037/243* (2013.01);

(Continued)

(58) Field of Classification Search
CPC ........ B01J 19/00; B01J 19/0093; B01J 19/24; B01J 2219/00049–2219/0006; B01J 2219/00783; B01J 2219/00804; B01J 2219/00824; B01J 2219/00833; B01J 2219/00842; B01J 2219/00873; B01J 2219/00894; B32B 37/00; B32B 37/12; B32B 37/14; B32B 2037/24; B32B 2037/243; B32B 2037/246; B32B 2315/00; B32B 2315/08; B32B 2535/00; B32B 37/24
See application file for complete search history.

(56) References Cited

U.S. PATENT DOCUMENTS 6,932,951 B1 *  8/2005  Losey .................. B01J 19/0093
                                                         422/211
7,993,934 B2     8/2011  Tabata et al.
(Continued)

FOREIGN PATENT DOCUMENTS

JP    2004-061320 A    2/2004
JP    2006-346653 A    12/2006
(Continued)

*Primary Examiner* — Natasha Young
(74) *Attorney, Agent, or Firm* — Global IP Counselors, LLP (57) ABSTRACT

A chemical synthesis device that can easily control the temperature of a fluid in a channel is provided. An embodiment of a chemical synthesis device according to the invention includes a substrate provided with a first channel in which a plurality of fluids are subjected to a chemical synthesis and a second channel for controlling a temperature of the fluids flowing through the first channel.

7 Claims, 9 Drawing Sheets

(51) Int. Cl.
   *B32B 37/14*   (2006.01)
   *B32B 37/24*   (2006.01)
(52) U.S. Cl.
   CPC ..... *B32B 2037/246* (2013.01); *B32B 2315/08* (2013.01); *B32B 2535/00* (2013.01)

(56) References Cited

U.S. PATENT DOCUMENTS

| | | | |
|---|---|---|---|
| 8,145,560 B2* | 3/2012 | Kulkarni | G06Q 40/00 379/114.14 |
| 2007/0074773 A1* | 4/2007 | Shiraishi | B01J 19/0093 137/828 |
| 2009/0107030 A1 | 4/2009 | Tabata et al. | |
| 2014/0024126 A1 | 1/2014 | Ogusu | |

FOREIGN PATENT DOCUMENTS

| | | |
|---|---|---|
| JP | 2007-278789 A | 10/2007 |
| JP | 2009-106864 A | 5/2009 |
| JP | 2014-020920 A | 2/2014 |

* cited by examiner

CHEMICAL SYNTHESIS DEVICE AND METHOD FOR MANUFACTURING CHEMICAL SYNTHESIS DEVICE

BACKGROUND

1. Technical Field

This application claims a priority to Japanese Patent Applications No. 2014-132273 filed on Jun. 27, 2014 and No. 2015-030329 filed on Feb. 19, 2015 which are hereby expressly incorporated by reference in its entirety.

Several aspects of the present invention relates to a chemical synthesis device and a method for manufacturing a chemical synthesis device.

2. Related Art

A microreactor has been used as a device that performs a chemical reaction in a space measuring 1 mm or less per side, for example. A simple microreactor has a configuration in which minute grooves are formed in a T-shape in a board, the board is covered with a lid, and tubes are connected thereto. In order to efficiently perform a chemical reaction in such a microreactor, a microreactor equipped with a heater for heating the inside of a confluence channel has been proposed as described in JP-A-2006-346653, for example.

JP-A-2006-346653 is an example of related art.

However, it is difficult to uniformly heat a fluid in the confluence channel with the heater in the microreactor as described above, which makes it difficult to control the temperature of the fluid in the confluence channel. Therefore, there is a problem in that the efficiency of the chemical reaction in the confluence channel cannot be sufficiently improved.

SUMMARY

An advantage of some aspects of the invention is to provide a chemical synthesis device that can easily control the temperature of a fluid in a channel and a method for manufacturing such a chemical synthesis device.

A chemical synthesis device according to an aspect of the invention includes a substrate provided with a first channel in which a plurality of fluids are subjected to a chemical synthesis and a second channel that is different from the first channel. A medium for controlling a temperature of the fluids flowing through the first channel flows through the second channel.

With this configuration, the substrate is provided with the second channel that is different from the first channel, and the medium for controlling the temperature of the fluids flowing through the first channel flows through the second channel. Therefore, the temperature of the fluids in the first channel can be controlled by the medium by disposing the second channel along the first channel, for example. Accordingly, with this configuration, the temperature of the fluids in the channel can be easily controlled.

In the above-described aspect of the chemical synthesis device, it is preferable that the first channel includes a plurality of introduction channel portions from which the plurality of fluids are respectively introduced and a synthesis channel portion in which the plurality of fluids are subjected to synthesis, and the second channel includes a first control channel portion for controlling the temperature of the fluids flowing through the synthesis channel portion.

This configuration enables the chemical synthesis device to have a structure that can promote the chemical synthesis reaction in the first channel.

In the above-described aspect of the chemical synthesis device, it is preferable that the first control channel portion has a temperature maintaining portion for maintaining a temperature of a fluid resulting from chemical synthesis that flows through the synthesis channel portion at a predetermined temperature.

This configuration enables the chemical synthesis device to have a structure in which, even if a fluid resulting from chemical synthesis in the first channel decomposes due to a decrease in temperature, for example, the decomposition of the chemically synthesized fluid can be suppressed by maintaining the temperature at a predetermined temperature.

In the above-described aspect of the chemical synthesis device, it is preferable that the second channel includes a second control channel portion for controlling the temperature of the fluids flowing through the introduction channel portions.

This configuration enables the chemical synthesis device to have a structure according to which the temperature of the fluids flowing into the synthesis channel portion can be adjusted to a temperature suitable for the chemical synthesis reaction.

In the above-described aspect of the chemical synthesis device, it is preferable that the width of the second channel is larger than the width of the first channel.

This configuration enables the chemical synthesis device to have a structure in which, even in the case where the fluids leak from the first channel, the leaking fluids can be easily recovered by the second channel.

It is preferable that the medium is inert to the fluids flowing through the first channel.

This configuration enables the chemical synthesis device to have a structure in which, even in the case where the fluids leak from the first channel and come into contact with the medium, for example, the reaction of the fluids in the first channel and the medium can be suppressed.

It is preferable that the second channel is provided along at least a portion of the first channel.

This configuration enables the chemical synthesis device to have a structure according to which the temperature of the fluids of the first channel can be easily controlled.

A method for manufacturing a chemical synthesis device according to an aspect of the invention is a method for manufacturing a chemical synthesis device having a first channel in which a plurality of fluids are subjected to chemical synthesis. The method includes forming a side wall layer on a substrate. The side wall layer is provided with a first through hole and a second through hole. The first through hole forms a portion of the first channel. The second through hole forms a portion of a second channel that is different from the first channel. A medium for controlling a temperature of the fluids flowing through the first channel flows through the second channel.

With this method, a chemical synthesis device that can easily control the temperature of a fluid in a channel can be manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes a chemical synthesis device according to embodiments of the invention with reference to the drawings. It should be noted that the scope of the invention is not limited to the embodiments described below and various modifications can be freely made without departing from the technical idea of the invention. Moreover, in the drawings below, scales, numbers, and the like in each structure may be different from those in the actual structure in order to facilitate the understanding of each configuration.

It should be noted that the terms "upstream side" and "downstream side" herein relate to flow in a channel.

In addition, the term "flow direction" herein means a main direction of flow in a channel.

First Embodiment

Chemical Synthesis Device

Figure 1:
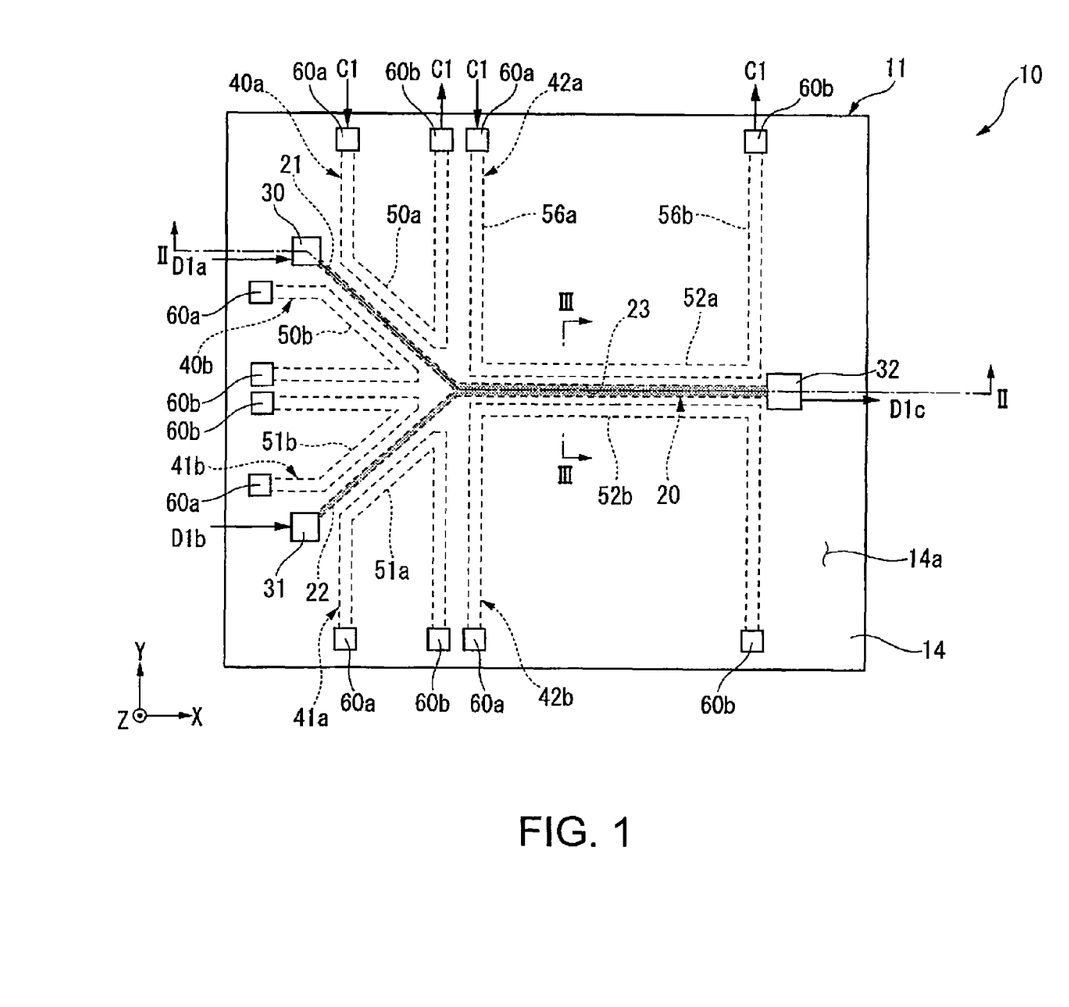
FIG. 1 is a plan view of a chemical synthesis device according to a first embodiment.
Figure 2:
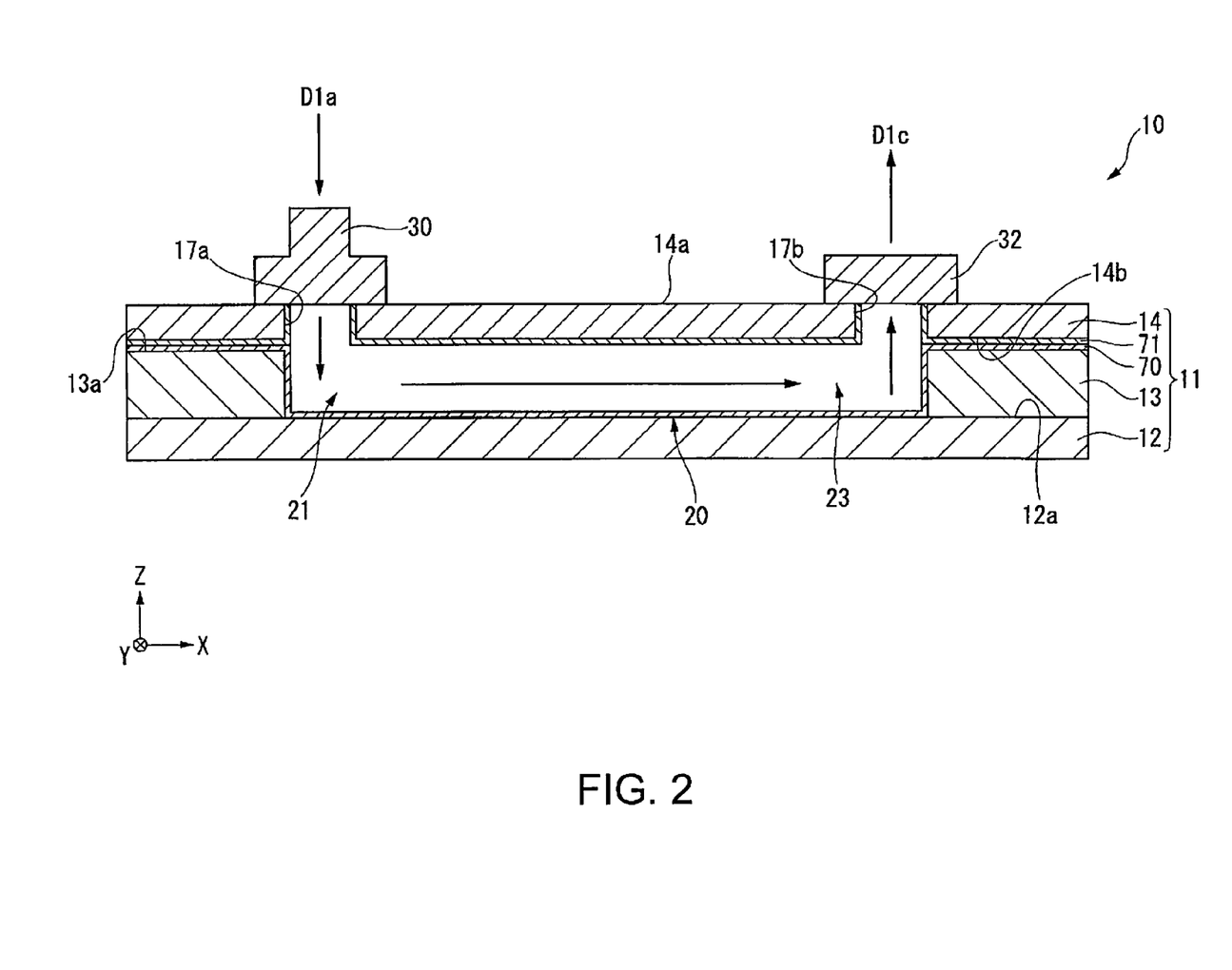
FIG. 2 is a cross-sectional view of the chemical synthesis device according to the first embodiment, taken along line II-II in FIG. 1.
Figure 3:
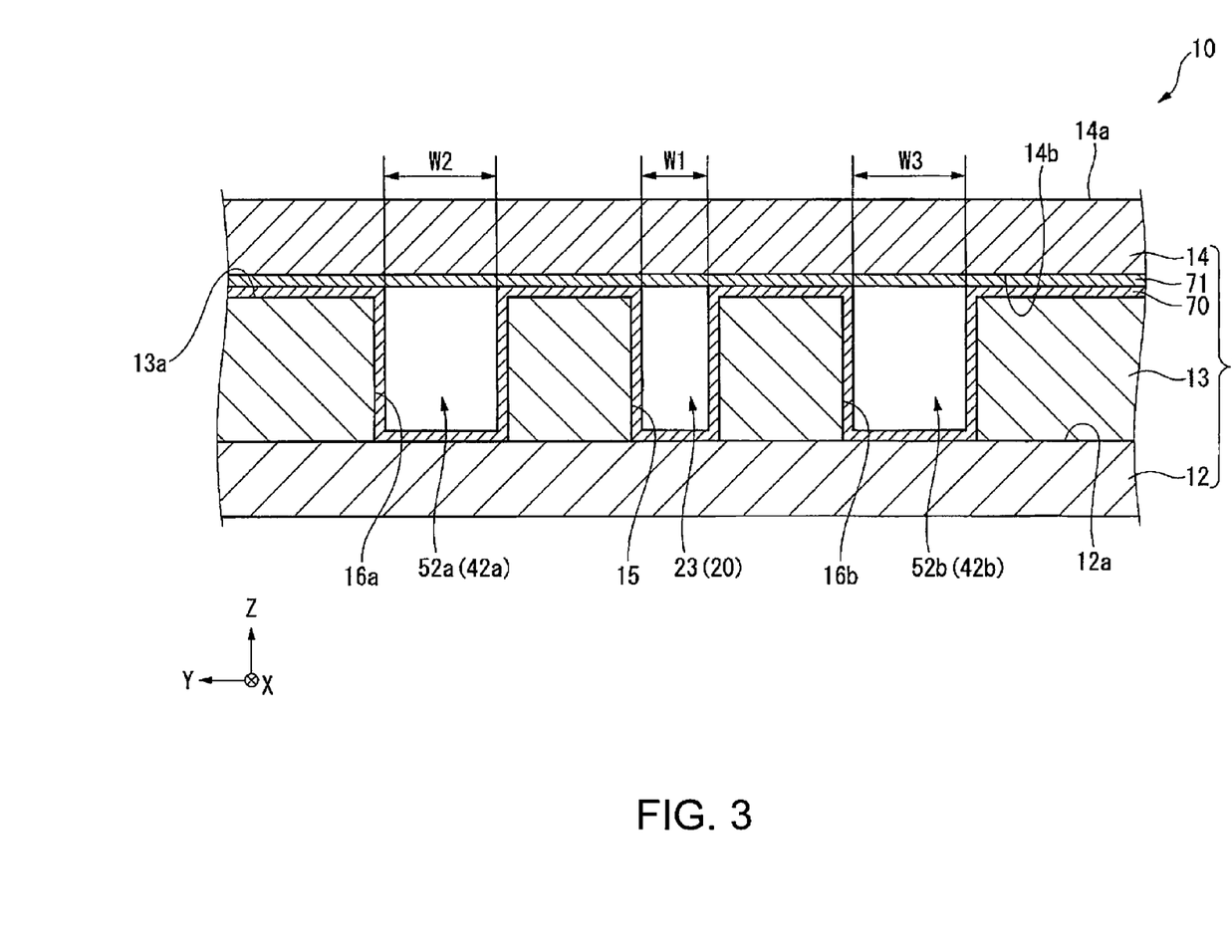
FIG. 3 is a cross-sectional view of the chemical synthesis device according to the first embodiment, taken along line III-III in FIG. 1.

FIGS. 1 to 3 show a chemical synthesis device 10 according to this embodiment. FIG. 1 is a plan view. FIG. 2 is a cross-sectional view taken along line II-II in FIG. 1. FIG. 3 is a cross-sectional view taken along line III-III in FIG. 1.

It should be noted that in the following description, an XYZ coordinate system is set and the positional relationship in each configuration is described with reference to this XYZ coordinate system. In this case, the direction of the normal line of a substrate 11 (see FIG. 1) is taken as the direction of the Z-axis, the width direction of the substrate 11, that is, the vertical direction in FIG. 1 is taken as the direction of the Y-axis, and the length direction of the substrate 11, that is, the left-right direction in FIG. 1 is taken as the direction of the X-axis.

As shown in FIG. 1, the chemical synthesis device 10 according to this embodiment includes the substrate 11, a reagent injection device 30, a reagent injection device 31, a product removing device 32, a plurality of medium injection devices 60a, and a plurality of medium removing devices 60b.

Substrate

There is no particular limitation on the shape of the substrate 11. In this embodiment, the substrate has a rectangular shape in a plan view (in the XY plane), for example. As shown in FIGS. 1 and 2, a synthesis channel (first channel) 20, a temperature control channel (second channel) 40a, a temperature control channel (second channel) 40b, a temperature control channel (second channel) 41a, a temperature control channel (second channel) 41b, a temperature control channel (second channel) 42a, and a temperature control channel (second channel) 42b are formed inside the substrate 11. In other words, the substrate 11 is provided with a synthesis channel 20 and temperature control channels 40a to 42b that are different from the synthesis channel 20. The synthesis channel 20 and the temperature control channels 40a to 42b will be described in detail later.

As shown in FIG. 2, the substrate 11 is configured by laminating a first substrate 12, a side wall layer 13, a first protective film 70, a second protective film 71, and a second substrate 14, in the stated order.

The first substrate 12 is a glass substrate, for example. The side wall layer 13 is provided on an upper surface 12a of the first substrate 12 on the synthesis channel 20 side (+Z side).

As shown in FIG. 3, the side wall layer 13 is provided with a channel through hole (first through hole) 15 that penetrates the side wall layer 13 in the thickness direction (direction of the Z-axis) at a position corresponding to the synthesis channel 20. The channel through hole 15 forms a portion of the synthesis channel 20.

The side wall layer 13 is provided with a channel through hole (second through hole) 16a and a channel through hole (second through hole) 16b that penetrate the side wall layer 13 in the thickness direction at positions corresponding to the temperature control channel 42a and the temperature control channel 42b, respectively. The channel through hole 16a forms a portion of the temperature control channel 42a. The channel through hole 16b forms a portion of the temperature control channel 42b.

Although not shown in the figures, the side wall layer 13 is similarly provided with channel through holes (second through holes) that penetrate the side wall layer 13 in the thickness direction at positions corresponding to the temperature control channels 40a to 41b, respectively. The channel through holes respectively form portions of the temperature control channels 40a to 41b.

A material for forming the side wall layer 13 can be selected from inorganic substances, such as $SiO_2$ and SiN, photosensitive resins, or the like. The material for forming the side wall layer 13 can be determined according to the fluid that is to flow through the synthesis channel 20. For example, in the case where the fluid that is to flow through the synthesis channel 20 is hydrofluoric acid, it is preferable to select a photosensitive resin that has a high corrosion resistance against hydrofluoric acid as the material for forming the side wall layer 13.

Moreover, it is preferable that the material for forming the side wall layer 13 has a high thermal conductivity. This is because heat is easily exchanged between a later-described temperature control medium C1 flowing through the temperature control channels 40a to 41b and the fluid flowing through the synthesis channel 20. The first protective film 70 is provided on an upper surface 13a of the side wall layer 13 on the second substrate 14 side (+Z side).

The first protective film 70 is provided so as to cover the upper surface 13a of the side wall layer 13, inner wall surfaces of the channel through holes 15, 16a and 16b in the side wall layer 13, and the upper surface 12a of the first substrate 12 at the positions in which the channel through holes 15, 16a and 16b are formed. A material for forming the first protective film 70 can be selected in the same manner as with the side wall layer 13, for example.

The second protective film 71 is provided on the first protective film 70 on the second substrate 14 side (+Z side). As shown in FIG. 2, the second protective film 71 covers a lower surface 14b of the second substrate 14 on the synthesis channel 20 side (−Z side) and inner wall surfaces of a plurality of through holes formed in the second substrate 14, which will be described later. A material for forming the second protective film 71 can be selected in the same manner as in the first protective film 70, for example.

The second substrate 14 is provided on the side wall layer 13 on the upper surface 13a side (+Z side) via the first protective film 70 and the second protective film 71. The second substrate 14 is a glass substrate, for example. A through hole 17a and a through hole 17b are formed in an upper surface 14a of the second substrate 14 on a side (+Z side) opposite to the synthesis channel 20 side. The through hole 17a is formed corresponding to the position in which the reagent injection device 30 is provided. The through hole 17b is formed corresponding to the position in which the product removing device 32 is provided.

Although not shown in the figures, in the upper surface 14a of the second substrate 14, through holes are formed corresponding to the position at which the reagent injection device 31 is provided, the positions at which the plurality of medium injection devices 60a are provided, and the positions at which the plurality of medium removing devices 60b are provided.

Synthesis Channel

The synthesis channel 20 is a channel for subjecting a plurality of reagents (fluids) to chemical synthesis. A fluid, that is, a reagent to be subjected to chemical synthesis or a product produced by chemical synthesis flows through the synthesis channel 20. There is no particular limitation on the cross-sectional shape of the synthesis channel 20, and the synthesis channel 20 may have a circular or a rectangular cross-sectional shape. In this embodiment, the synthesis channel 20 has a rectangular cross-sectional shape as shown in FIG. 3, for example. As shown in FIG. 1, the synthesis channel 20 includes a first introduction channel portion (introduction channel portion) 21, a second introduction channel portion (introduction channel portion) 22, and a synthesis channel portion 23.

The first introduction channel portion 21 is a portion of the synthesis channel 20 through which a reagent (fluid) is introduced. In this embodiment, a reagent (fluid) D1a is introduced through the first introduction channel portion 21.

As shown in FIG. 2, the end portion of the first introduction channel portion 21 on the upstream side is connected to the reagent injection device 30 via the through hole 17a in the second substrate 14. As shown in FIG. 1, the end portion of the first introduction channel portion 21 on the downstream side is connected to the synthesis channel portion 23.

The second introduction channel portion 22 is a portion of the synthesis channel 20 through which a reagent (fluid) is introduced. In this embodiment, a reagent (fluid) D1b is introduced through the second introduction channel portion 22. Although not shown in the figures, the end portion of the second introduction channel portion 22 on the upstream side is connected to the reagent injection device 31 via the through hole formed in the second substrate 14. The end portion of the second introduction channel portion 22 on the downstream side is connected to the synthesis channel portion 23.

The synthesis channel portion 23 is a portion of the synthesis channel 20 in which a plurality of reagents (fluids) are subjected to synthesis. The end portion of the synthesis channel portion 23 on the upstream side is connected to the first introduction channel portion 21 and the second introduction channel portion 22. As shown in FIG. 2, the end portion of the synthesis channel portion 23 on the downstream side is connected to the product removing device 32 via the through hole 17b in the second substrate 14. In this embodiment, the synthesis channel portion 23 is formed so as to extend in the length direction of the substrate 11 (direction of the X-axis).

The reagent D1a flows through the first introduction channel portion 21 into the synthesis channel portion 23, and the reagent D1b flows through the second introduction channel portion 22 into the synthesis channel portion 23. In this embodiment, in the synthesis channel portion 23, the reagent D1a and the reagent D1b are subjected to chemical synthesis to produce a product (fluid) D1c.

The length of the synthesis channel portion 23 (length in the direction of the X-axis in FIG. 1) is set according to the chemical synthesis reaction of the reagent D1a and the reagent D1b. That is, the longer the period of time required for the chemical synthesis reaction of the reagent D1a and the reagent D1b is, the longer the length of the synthesis channel portion 23 is set to be, and the shorter the period of time required for the chemical synthesis reaction of the reagent D1a and the reagent D1b is, the shorter the length of the synthesis channel portion 23 is set to be.

Temperature Control Channel

As shown in FIG. 1, the temperature control channels 40a to 42b are channels through which a medium for controlling the temperature of the fluids flowing through the synthesis channel 20. That is, the temperature of the reagent D1a, the reagent D1b, and the product D1c, which flow through the synthesis channel 20, are controlled by the temperature control channels 40a to 42b.

The temperature control channels 40a and 40b constitute a pair of channels for controlling the temperature of the fluid in the first introduction channel portion 21, that is, the reagent D1a. The temperature control channels 41a and 41b constitute a pair of channels for controlling the temperature of the fluid in the second introduction channel portion 22, that is, the reagent D1b. The temperature control channels 42a and 42b constitute a pair of channels for controlling the temperature of the fluids in the synthesis channel portion 23, that is, the reagent D1a, the reagent D1b and the product D1c.

It should be noted that the temperature control channels 40a to 42b have substantially the same configurations, except that the temperature control channels 40a to 42b control temperatures at different positions, and therefore, the temperature control channel 42a is used as a representative of these in the following description in some cases.

The temperature control channel 42a includes a control channel portion (first control channel portion) 52a, a connection channel portion 56a, and a connection channel portion 56b.

The control channel portion 52a is a channel portion for controlling the temperature of the fluid flowing through the synthesis channel portion 23. The control channel portion 52a is provided along the synthesis channel portion 23 at a position near the synthesis channel portion 23. In this embodiment, the control channel portion 52a is provided along substantially the entire synthesis channel portion 23. The connection channel portion 56a is connected to one end of the control channel portion 52a. The connection channel portion 56b is connected to the other end of the control channel portion 52a. As shown in FIG. 3, the width W2, that is, the length in the direction (direction of the Y-axis) orthogonal to the flow direction of the fluid and to the direction (direction of the Z-axis) of the normal line of the main surface of the substrate 11, of the control channel portion 52a is larger than the width W1 of the synthesis channel portion 23.

It should be noted that in this description, providing a control channel portion near a synthesis channel portion includes providing the control channel portion within a range in which heat can be sufficiently exchanged between the medium in the control channel portion and the fluid in the synthesis channel portion.

As shown in FIG. 1, one end of the connection channel portion 56a is connected to the control channel portion 52a, and the other end of the connection channel portion 56a is connected to the medium injection device 60a via a through hole (not shown) provided in the upper surface 14a of the second substrate 14. One end of the connection channel portion 56b is connected to the control channel portion 52a, and the other end of the connection channel portion 56b is connected to the medium removing device 60b via a through hole (not shown) provided in the upper surface 14a of the second substrate 14.

In this embodiment, the temperature control medium (medium) C1 flows through the temperature control channel 42a as the medium. The temperature control medium C1 can be selected from water ($H_2O$), aqueous solutions obtained by adding another substance to water, silicone oil, and the like. It is preferable that the temperature control medium C1 is inert to the reagent D1a, the reagent D1b, and the product D1c. This is because in the case where the reagent D1a, the reagent D1b, or the product D1c leaks, the reaction of the reagent D1a, the reagent D1b, or the product D1c and the temperature control medium C1 can be suppressed. The temperature of the temperature control medium C1 flowing through the temperature control channel 42a is set according to the temperature of the fluid flowing through the synthesis channel portion 23 to be controlled.

The temperature control channel 42b includes a control channel portion (first control channel portion) 52b. The control channel portion 52b is a channel portion for controlling the temperature of the fluid flowing through the synthesis channel portion 23, similarly to the control channel portion 52a. The control channel portion 52b is provided along the synthesis channel portion 23 at a position near the synthesis channel portion 23. The control channel portion 52b and the control channel portion 52a are provided so as to be opposed to each other in the width direction of the substrate 11 (direction of the Y-axis). As shown in FIG. 3, the width W3 of the control channel portion 52b is larger than the width W1 of the synthesis channel portion 23. In this embodiment, the width W3 of the control channel portion 52b is the same as the width W2 of the control channel portion 52a of the temperature control channel 42a.

As shown in FIG. 1, the temperature control channel 40a includes a control channel portion (second control channel portion) 50a. The temperature control channel 40b includes a control channel portion (second control channel portion) 50b. The control channel portion 50a and the control channel portion 50b are channel portions for controlling the temperature of the fluid flowing through the first introduction channel portion 21. The temperature control channels 40a and 40b are configured in the same manner as the temperature control channels 42a and 42b, except that the temperature control channels 40a and 40b are provided for the first introduction channel portion 21.

The temperature control channel 41a includes a control channel portion (second control channel portion) 51a. The temperature control channel 41b includes a control channel portion (second control channel portion) 51b. The control channel portion 51a and the control channel portion 51b are channel portions for controlling the temperature of the fluid flowing through the second introduction channel portion 22.

The temperature control channels 41a and 41b are configured in the same manner as the temperature control channels 42a and 42b, except that the temperature control channels 41a and 41b are provided for the second introduction channel portion 22.

Reagent Injection Device

The reagent injection device 30 is a device for injecting a reagent into the first introduction channel portion 21. As shown in FIG. 2, the reagent injection device 30 is provided on the upper surface 14a of the second substrate 14 at the position at which the through hole 17a is formed. In this embodiment, the reagent injection device 30 is used to inject the reagent D1a into the first introduction channel portion 21 through the through hole 17a.

As shown in FIG. 1, the reagent injection device 31 is a device for injecting a reagent into the second introduction channel portion 22. The reagent injection device 31 is provided on the upper surface 14a of the second substrate 14 at the position at which a through hole (not shown) that is in communication with the second introduction channel portion 22 is formed. In this embodiment, the reagent injection device 31 is used to inject the reagent D1b into the second introduction channel portion 22 through the through hole. There is no particular limitation on the reagent injection devices 30 and 31, and any known injection device may be used.

Product Removing Device

The product removing device 32 is a device for removing a product produced in the synthesis channel portion 23 to the outside of the substrate 11. As shown in FIG. 2, the product removing device 32 is provided on the upper surface 14a of the second substrate 14 at the position at which the through hole 17b is formed. In this embodiment, the product removing device 32 is used to remove the product D1c from the inside of the synthesis channel portion 23 to the outside of the substrate 11 through the through hole 17b. There is no particular limitation on the product removing device 32, and any known removing device may be used.

Medium Injection Device and Medium Removing Device

The plurality of medium injection devices 60a are devices for injecting the temperature control medium C1 into the respective temperature control channels. There is no particular limitation on the medium injection device 60a, and any known injection device may be used. The medium removing devices 60b are devices for removing the temperature control medium C1. There is no particular limitation on the medium removing device 60b, and any known removing device may be used.

The temperature control medium C1 flows from the medium injection device 60a into the connection channel portion 56a of the temperature control channel 42a, flows through the control channel portion 52a and the connection channel portion 56b, and is removed from the medium removing device 60b. In this manner, the temperature control medium C1 flows through the temperature control channel 42a. The same applies to the other temperature control channels 40a to 41b and 42b.

Next, a formation process of the product D1c in the chemical synthesis device 10 will be described in detail.

In the state in which the temperature control medium C1 whose temperature is adjusted flows through the temperature control channels 40a to 42b, the reagent D1a is injected into the first introduction channel portion 21 from the reagent injection device 30 and the reagent D1b is injected into the second introduction channel portion 22 from the reagent injection device 31.

The temperature of the reagent D1*a* injected into the first introduction channel portion 21 from the reagent injection device 30 is controlled by the temperature control medium C1 flowing through the control channel portions 50*a* and 50*b* of the temperature control channels 40*a* and 40*b*. Specifically, in the case where the reagent D1*a* is heated, the temperature of the temperature control medium C1 is set to a temperature higher than that of the reagent D1*a* at the time of the injection, and in the case where the reagent D1*a* is cooled, the temperature of the temperature control medium C1 is set to a temperature lower than that of the reagent D1*a* at the time of the injection. Heat is exchanged between the temperature control medium C1 and the reagent D1*a* via the side wall layer 13, thus controlling the temperature of the reagent D1*a*.

The temperature of the reagent D1*a* to be controlled is set to a temperature suitable for the chemical synthesis reaction with the reagent D1*b*. The reagent D1*a* flows into the synthesis channel portion 23 in the state in which the temperature is controlled by the temperature control channels 40*a* and 40*b*.

In the same manner, the temperature of the reagent D1*b* injected into the second introduction channel portion 22 is controlled by the temperature control medium C1 flowing through the control channel portions 51*a* and 51*b* of the temperature control channels 41*a* and 41*b*. The reagent D1*b* flows into the synthesis channel portion 23 in the state in which the temperature is controlled by the temperature control channels 41*a* and 41*b*.

The reagent D1*a* and the reagent D1*b*, which have flown into the synthesis channel portion 23 as described above, are subjected to a chemical synthesis to produce the product D1*c*. The temperature of the reagent D1*a*, the reagent D1*b*, and the product D1*c* in the synthesis channel portion 23 is controlled by the temperature control medium C1 flowing through the control channel portions 52*a* and 52*b* of the temperature control channels 42*a* and 42*b*.

The temperature of the reagent D1*a*, the reagent D1*b*, and the product D1*c* in the synthesis channel portion 23 is controlled according to the chemical reaction in which the reagent D1*a* and the reagent D1*b* are to be subjected to chemical synthesis. Specifically, in the case where the rate of the chemical reaction of the reagent D1*a* and the reagent D1*b* is increased, for example, it is sufficient that the reagent D1*a* and the reagent D1*b* are heated. Moreover, in the case where the chemical reaction of the reagent D1*a* and the reagent D1*b* is a reversible reaction and is in equilibrium in the synthesis channel portion 23, if the synthesis reaction of the reagent D1*a* and the reagent D1*b* is an exothermic reaction, it is possible to advance the reaction toward the production of the product D1*c* by cooling the reagents and lowering the temperature. On the other hand, if the chemical reaction of the reagent D1*a* and the reagent D1*b* is an endothermic reaction, the reaction can advance toward the production of the product D1*c* when the reagents are heated to raise the temperature.

The product D1*c* produced as described above is removed to the outside of the chemical synthesis device 10 using the product removing device 32.

Method for Manufacturing a Chemical Synthesis Device

Figure 4:
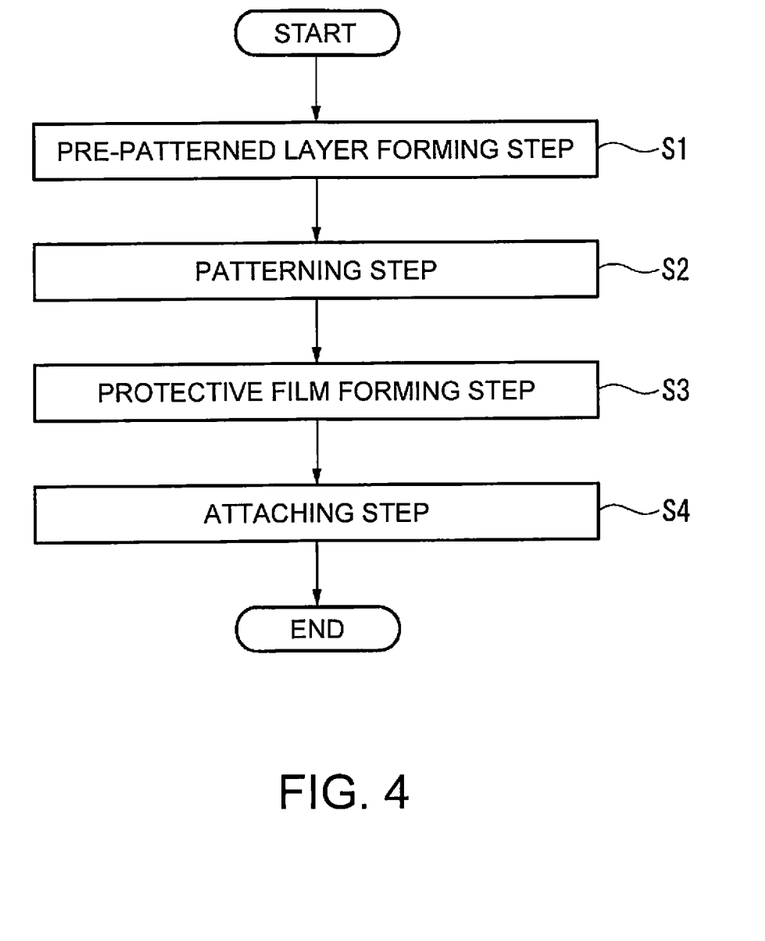
FIG. 4 is a flowchart illustrating a procedure of a method for manufacturing the chemical synthesis device according to the first embodiment.

Next, a method for manufacturing the chemical synthesis device 10 according to this embodiment will be described. FIG. 4 is a flowchart illustrating a procedure of a method for manufacturing the chemical synthesis device 10 according to this embodiment. FIGS. 5A to 5D are partially enlarged cross-sectional views illustrating the procedure of a method for manufacturing the chemical synthesis device 10 according to this embodiment.

As shown in FIG. 4, the method for manufacturing the chemical synthesis device 10 according to this embodiment has a pre-patterned layer forming step S1, a patterning step S2, a protective film forming step S3, and an attaching step S4.

Figure 5A:
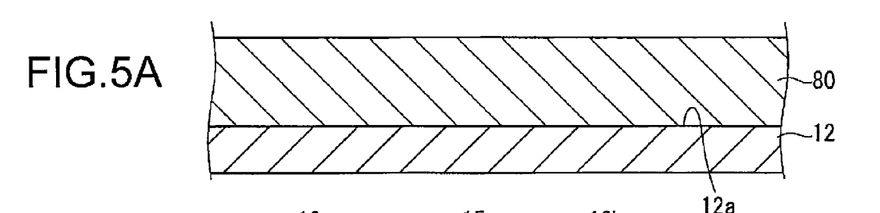
FIGS. 5A to 5D are cross-sectional views illustrating the procedure of a method for manufacturing the chemical synthesis device according to the first embodiment.

First, as shown in FIG. 5A, the pre-patterned layer forming step S1 is a step of forming a pre-patterned layer 80 on the upper surface 12*a* of the first substrate 12. The pre-patterned layer 80 is a layer made of the material for forming the side wall layer 13. There is no particular limitation on the method for forming the pre-patterned layer 80, and a method in which the material for forming the side wall layer 13 is applied onto the upper surface 12*a* of the first substrate 12 can be used, for example. There is no particular limitation on the applying method, and the applying method can be selected from a screen printing method, a die coating method, an inkjet method, a dispenser method, a spin coating method, a slit coating method, and the like. In this step, the pre-patterned layer 80 is formed on the upper surface 12*a* of the first substrate 12.

Figure 5B:
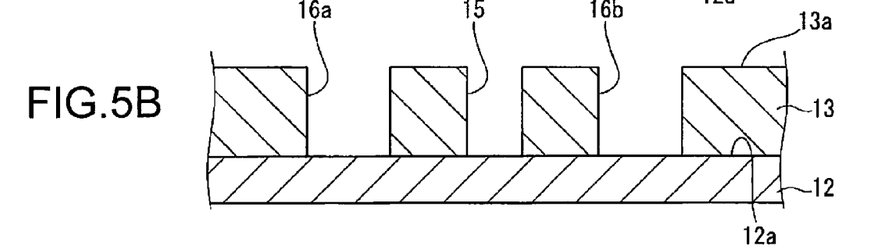

Next, as shown in FIG. 5B, the patterning step S2 is a step of patterning the pre-patterned layer 80 to form the side wall layer 13. There is no particular limitation on the method for patterning the pre-patterned layer 80, and in the case where a photosensitive material is used as a material for forming the pre-patterned layer 80, for example, a method in which a mask is used to perform exposure and development can be used.

Wet etching, dry etching, or the like may also be used as the method for patterning the pre-patterned layer 80. In this step, the channel through holes 15, 16*a*, and 16*b* are formed in the pre-patterned layer 80, and thus the side wall layer 13 is formed. The upper surface 12*a* of the first substrate 12 is exposed at the positions at which the channel through holes 15, 16*a*, and 16*b* are formed.

It should be noted that a step combining the pre-patterned layer forming step S1 and the patterning step S2 corresponds to a step of forming a side wall layer that is described in the claims.

Figure 5C:
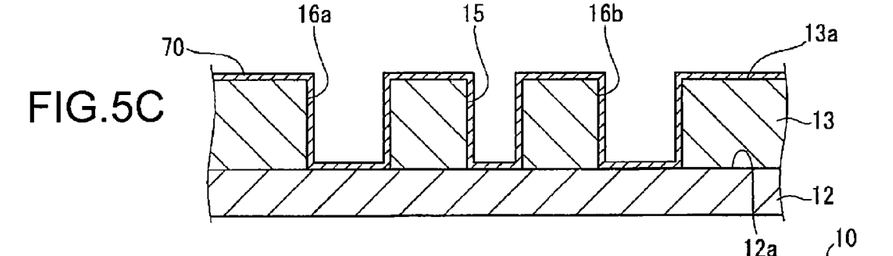

Next, as shown in FIG. 5C, the protective film forming step S3 is a step of forming the first protective film 70. The first protective film 70 is formed so as to cover the upper surface 13*a* of the side wall layer 13, the inner wall surfaces of the channel through holes 15, 16*a*, and 16*b*, and the exposed upper layer 12*a* of the first substrate 12. There is no particular limitation on the method for forming the first protective film 70, and the method can be selected from a chemical vapor deposition (CVD) method, the above-described applying methods, and the like. In this step, the first protective film 70 is formed.

Figure 5D:
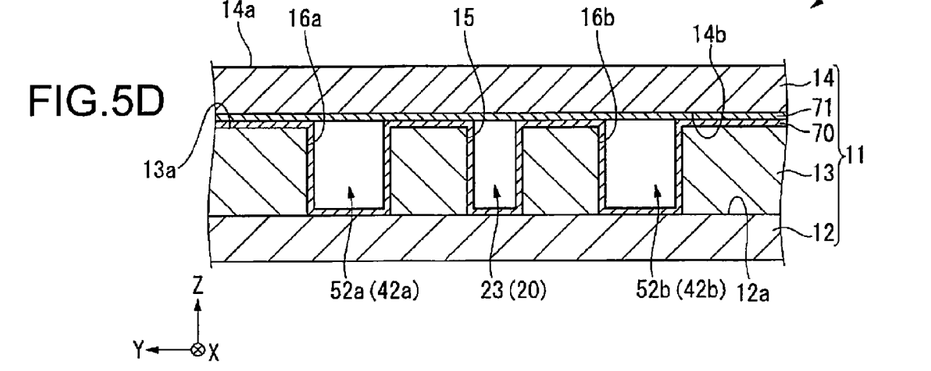

Next, as shown in FIG. 5D, the attaching step S4 is a step of attaching the second substrate 14. The second substrate 14 is attached to the side wall layer 13 on the upper surface 13*a* side (+Z side) via the first protective film 70. In this embodiment, the second protective film 71 is formed in advance on the lower surface 14*b* of the second substrate 14 to be attached. There is no particular limitation on the method for forming the second protective film 71, and the same method as the method for forming the first protective film 70 can be selected, for example.

There is no particular limitation on the method for attaching the second substrate 14, and a method using an adhesive can be used, for example. In this step, the synthesis channel 20, the temperature control channels 42*a* and 42*b*, and the temperature control channels 40a, 40b, 41a, and 41b (not shown in FIG. 5D) are formed.

The chemical synthesis device 10 according to this embodiment is manufactured using the above steps.

With this embodiment, the temperature control channels 40a to 42b are formed in the substrate 11, thus making it easy to uniformly heat or cool the reagents D1a and D1b and the product D1c flowing through the synthesis channel 20 with the temperature control medium C1 flowing through the temperature control channels 40a to 42b. Accordingly, with this embodiment, a chemical synthesis device that can easily control the temperature of the fluid in the synthesis channel 20 can be obtained.

With this embodiment, the temperature of the fluid flowing through the synthesis channel portion 23 can be controlled by the temperature control channels 42a and 42b, thus making it possible to promote the chemical reaction of the reagent D1a and the reagent D1b, and to improve the efficiency of production of the product D1c.

With this embodiment, the temperature of the reagent D1a flowing through the first introduction channel portion 21 and the temperature of the reagent D1b flowing through the second introduction channel portion 21 can be controlled by the temperature control channels 40a to 41b. The temperature of the reagent D1a and the temperature of the reagent D1b can be thereby adjusted to a temperature suitable for the chemical synthesis reaction, thus making it possible to promote the chemical reaction and to improve the efficiency of production of the product D1c.

With this embodiment, the widths W2 and W3 of the temperature control channels 42a and 42b are larger than the width W1 of the synthesis channel portion 23. Therefore, in the case where the fluid leaks from the synthesis channel portion 23, for example, the fluid that has leaked can be easily recovered by the flow of the temperature control medium C1 in the temperature control channels 42a and 42b. Accordingly, with this embodiment, it is possible to suppress leakage of the fluid flowing through the synthesis channel portion 23 to the outside of the substrate 11.

With this embodiment, a substance that is inert to the reagents D1a and D1b and the product D1c is used as the temperature control medium C1 flowing through the temperature control channels 40a to 42b, thus making it possible to suppress the occurrence of a chemical reaction in the case where the reagent D1a, the reagent D1b, or the product D1c leaks and comes into contact with the temperature control medium C1. With this embodiment, it is thereby possible to suppress damage to the substrate 11 caused by a substance produced by the reaction of the reagent D1a, the reagent D1b, or the product D1c and the temperature control medium C1.

With this embodiment, the control channel portions 52a and 52b of the temperature control channels 42a and 42b are provided along substantially the entire synthesis channel portion 23, thus making it possible to remove the product D1c from the product removing device 32 while maintaining the temperature of the product D1c. That is, a portion of each of the temperature control channels 42a and 42b on the downstream side corresponds to a temperature maintaining portion that is described in the claims.

This makes it possible to suppress decomposition of the product D1c while removing the product D1c from the product removing device 32 even if the product D1c decomposes due to a decrease in temperature, for example.

With the method for manufacturing a chemical synthesis device according to this embodiment, the synthesis channel 20 and the temperature control channels 40a to 42b can be formed simultaneously, thus making it easy to manufacture the chemical synthesis device 10.

It should be noted that the following configurations can be used in this embodiment.

In the above description, the synthesis channel portion 23 is configured so as to be provided with the pair of temperature control channels 42a and 42b, but there is no limitation to this. In this embodiment, the synthesis channel portion 23 may be configured so as to be provided with only one of the temperature control channels 42a and 42b. The same applies to the first introduction channel portion 21 and the second introduction channel portion 22.

In this embodiment, a configuration may be used in which the temperature control channels 40a, 40b, 41a, and 41b for controlling the temperature of the fluids in the first introduction channel portion 21 and the second introduction channel portion 22 are not provided.

In this embodiment, the widths W2 and W3 of the temperature control channels 42a and 42b may be set to be smaller than or equal to the width W1 of the synthesis channel portion 23.

In this embodiment, the width W2 of the temperature control channel 42a and the width W3 of the temperature control channel 42b may be different from each other.

In this embodiment, different substances may respectively flow through the temperature control channels 40a to 42b as the temperature control medium C1.

In the above description, the control channel portion 52a of the temperature control channel 42a is configured so as to be provided along the synthesis channel portion 23, but there is no limitation to this. In this embodiment, the control channel portion 52a may be freely disposed as long as the temperature of the fluid in the synthesis channel portion 23 can be controlled.

In the above description, the control channel portions 52a and 52b of the temperature control channels 42a and 42b are configured so as to be provided along substantially the entire synthesis channel portion 23, but there is no limitation to this. In this embodiment, the control channel portions 52a and 52b of the temperature control channels 42a and 42b may be provided along a portion of the synthesis channel portion 23. In this embodiment, the channel portions 52a and 52b may be configured so as to be provided along only a portion of the synthesis channel portion 23 on the upstream side, for example.

In this embodiment, one or both of the first protective film 70 and the second protective film 71 need not be provided. Moreover, the material for forming the first protective film 70 and the material for forming the second protective film 71 may be different or the same.

In this embodiment, the side wall layer 13 patterned by screen printing or the like may be formed directly on the upper surface 12a of the first substrate 12, for example, instead of performing the pre-patterned layer forming step S1 and the patterning step S2.

Second Embodiment

A second embodiment is different from the first embodiment in that three types of reagents are subjected to synthesis. It should be noted that in the following description, there are cases where descriptions will not be given for configurations that are similar to those in the above-described embodiment by using identical reference numerals as appropriate, or the like.

Figure 6:
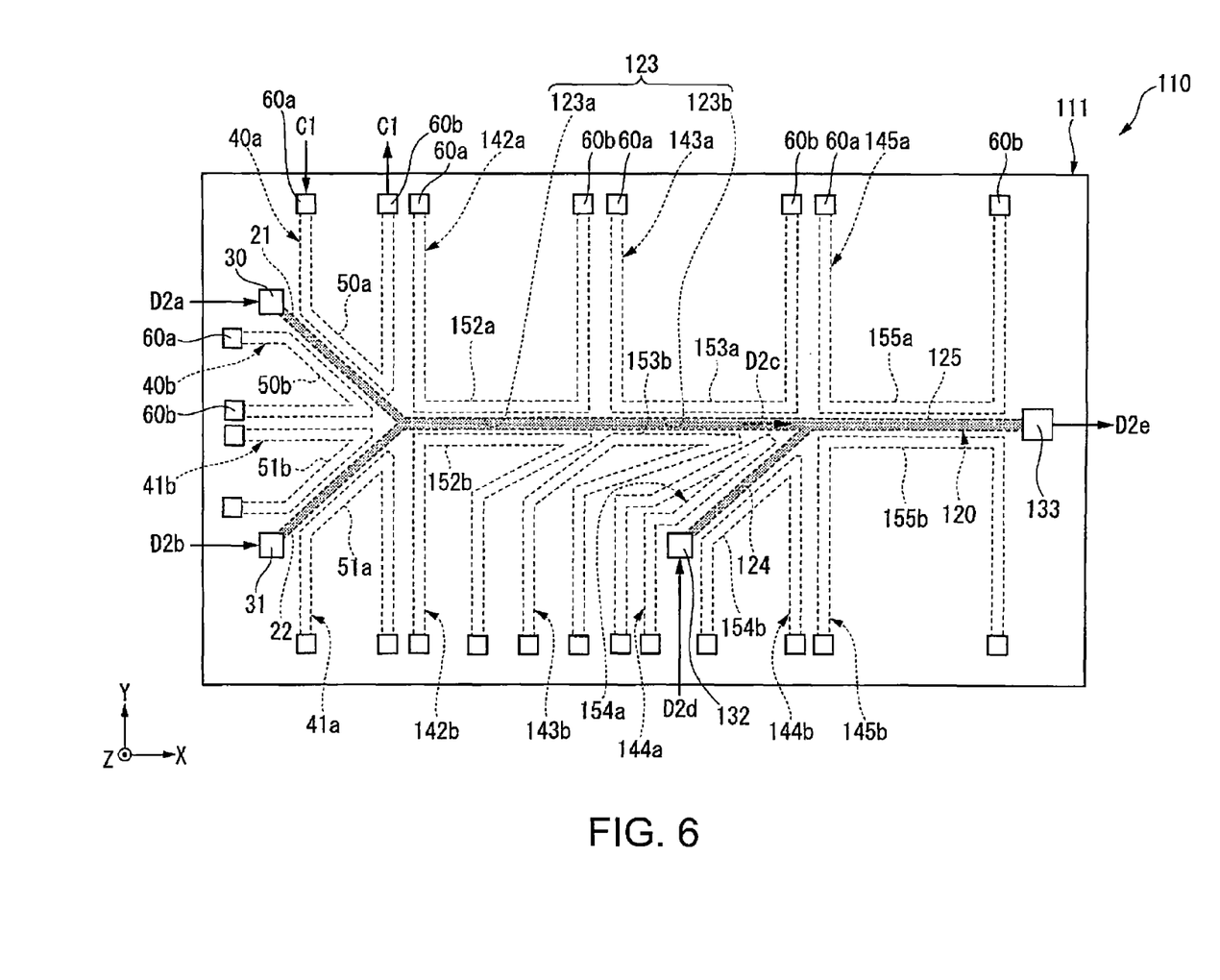
FIG. 6 is a plan view of a chemical synthesis device according to a second embodiment.

FIG. 6 is a plan view of a chemical synthesis device 110 according to this embodiment.

As shown in FIG. 6, the chemical synthesis device 110 according to this embodiment includes a substrate 111, a reagent injection device 30, a reagent injection device 31, a reagent injection device 132, a product removing device 133, a plurality of medium injection devices 60a, and a plurality of medium removing devices 60b.

A synthesis channel (first channel) 120, temperature control channels 40a to 41b, a temperature control channel (second channel) 142a, a temperature control channel (second channel) 142b, a temperature control channel (second channel) 143a, a temperature control channel (second channel) 143b, a temperature control channel (second channel) 144a, a temperature control channel (second channel) 144b, a temperature control channel (second channel) 145a, and a temperature control channel (second channel) 145b are formed inside the substrate 111. The substrate 111 is the same as the substrate 11 of the first embodiment, except that the channels formed thereinside are different.

The synthesis channel 120 includes a first introduction channel portion 21, a second introduction channel portion 22, a first synthesis channel portion (synthesis channel portion) 123, a third introduction channel portion (introduction channel portion) 124, and a second synthesis channel portion (synthesis channel portion) 125. In this embodiment, a reagent (fluid) D2a flows into the first introduction channel portion 21, and a reagent (fluid) D2b flows into the second introduction channel portion 22.

As the synthesis channel portion 23 of the first embodiment, the first synthesis channel portion 123 is a portion in which the reagent D2a flowing from the first introduction channel portion 21 and the reagent D2b flowing from the second introduction channel portion 22 are subjected to chemical synthesis. The reagent D2a and the reagent D2b are subjected to chemical synthesis to produce an intermediate product (fluid) D2c.

The end portion of the first synthesis channel portion 123 on the upstream side is connected to the first introduction channel portion 21 and the second introduction channel portion 22. The end portion of the first synthesis channel portion 123 on the downstream side is connected to the third introduction channel portion 124 and the second synthesis channel portion 125. The first synthesis channel portion 123 includes a reaction portion 123a provided on the upstream side and an introduction portion 123b provided on the downstream side.

The reaction portion 123a is a portion in which the chemical synthesis reaction of reagent D2a and the reagent D2b mainly occurs. That is, the length of the reaction portion 123a is set such that substantially all of the reagent D2a and the reagent D2b are used in the chemical synthetic reaction to produce the intermediate product D2c in the reaction portion 123a. The introduction portion 123b is a portion for introducing the produced intermediate product D2c to the second synthesis channel portion 125.

The third introduction channel portion 124 is a portion through which a reagent (fluid) flows. In this embodiment, a reagent D2d is injected into the third introduction channel portion 124 by the reagent injection device 132. The end portion of the third introduction channel portion 124 on the downstream side is connected to the second synthesis channel portion 125. The reagent injection device 132 is the same as the reagent injection device 30.

The second synthesis channel portion 125 is a portion in which the intermediate product D2c flowing from the first synthesis channel portion 123 and the reagent D2d flowing from the third introduction channel portion 124 are subjected to chemical synthesis. The end portion of the second synthesis channel portion 125 on the downstream side is connected to the product removing device 133. The intermediate product D2c and the reagent D2d are subjected to chemical synthesis to produce a product (fluid) D2e. The produced product D2e is removed from the product removing device 133. The product removing device 133 is the same as the product removing device 32 of the first embodiment.

The temperature control channels 142a and 142b are a pair of channels for controlling the temperature of the fluids in the reaction portion 123a of the first synthesis channel portion 123, that is, the reagent D2a, the reagent D2b, and the intermediate product D2c. The temperature control channel 142a includes a control channel portion (first control channel portion) 152a. The temperature control channel 142b includes a control channel portion (first control channel portion) 152b. The temperature control channels 142a and 142b are configured in the same manner as the temperature control channels 42a and 42b of the first embodiment, except that the temperature control channels 142a and 142b are provided for the reaction portion 123a.

The temperature control channels 143a and 143b are a pair of channels for controlling the temperature of the fluid in the introduction portion 123b of the first synthesis channel portion 123, that is, mainly the intermediate product D2c. The temperature control channel 143a includes a control channel portion (first control channel portion) 153a. The temperature control channel 143b includes a control channel portion (first control channel portion) 153b. The temperature control channels 143a and 143b are configured in the same manner as the temperature control channels 42a and 42b of the first embodiment, except that the temperature control channels 143a and 143b are provided for the introduction portion 123b.

The temperature control channels 144a and 144b are a pair of channels for controlling the temperature of the fluid in the third introduction channel portion 124, that is, the reagent D2d. The temperature control channel 144a includes a control channel portion (second control channel portion) 154a. The temperature control channel 144b includes a control channel portion (second control channel portion) 154b. The temperature control channels 144a and 144b are configured in the same manner as the temperature control channels 42a and 42b of the first embodiment, except that the temperature control channels 144a and 144b are provided for the third introduction portion 124.

The temperature control channels 145a and 145b are a pair of channels for controlling the temperature of the fluids in the second synthesis channel portion 125, that is, the intermediate product D2c, the reagent D2d and the product D2e. The temperature control channel 145a includes a control channel portion (first control channel portion) 155a. The temperature control channel 145b includes a control channel portion (first control channel portion) 155b. The temperature control channels 145a and 145b are configured in the same manner as the temperature control channels 42a and 42b of the first embodiment, except that the temperature control channels 145a and 145b are provided for the second synthesis channel portion 125.

In the first synthesis channel portion 123, the temperature of the fluid flowing through the reaction portion 123a and the temperature of the fluid flowing through the introduction portion 123b are different from each other, for example. That is, the temperature controlled by the temperature control channels 142a and 142b and the temperature controlled by the temperature control channels 143a and 143b are different from each other.

Specifically, the temperature of the fluid in the reaction portion 123a is set so as to promote the chemical reaction of the reagent D2a and the reagent D2b, and the temperature of the fluid in the reaction portion 123b is maintained at a temperature at which the intermediate product D2c does not decompose and is likely to react with the reagent D2d. In other words, the control channel portions 153a and 153b of the temperature control channels 143a and 143b maintain the temperature of the chemically synthesized intermediate product D2c at a predetermined temperature. That is, the control channel portions 153a and 153b of the temperature control channels 143a and 143b correspond to a temperature maintaining portion that is described in the claims.

With this embodiment, in the first synthesis channel portion 123, the reaction portion 123a on the upstream side is provided with the temperature control channels 142a and 142b, and the introduction portion 123b on the downstream side is provided with the temperature control channels 143a and 143b. Therefore, it is possible to separately control the temperature of the reaction portion 123a in which the main part of a chemical synthesis reaction occurs and the temperature of the introduction portion 123b through which the intermediate product D2c produced by the chemical synthesis reaction flows. This makes it possible to promote the chemical reaction in the first synthesis channel portion 123 and to promote the chemical reaction in the second synthesis channel portion 125. Accordingly, with this embodiment, it is possible to improve the efficiency of production of the product D2e.

It should be noted that in the first embodiment and the second embodiment, there is no particular limitation on the arrangement of the synthesis channel and the temperature control channel, and the synthesis channel and the temperature control channel may be freely disposed.

In the first embodiment and the second embodiment, two and three types of reagents are subjected to synthesis, but there is no limitation to this. The invention may be applied to a chemical synthesis device in which four or more types of reagents are subjected to synthesis.

Here, chemical synthesis devices according to a modified example of the above embodiments will be described. Since there is no particular limitation on the arrangement of the temperature control channel in the chemical synthesis device according to the above embodiments, examples in which the temperature control channel in the synthesis channel portion 23 according to the first embodiment is modified will be shown hereinafter.

It should be noted that identical reference numerals are given to constituent members identical to members of the first embodiment, and descriptions thereof are omitted or simplified.

Modified Example 1

Figure 7:
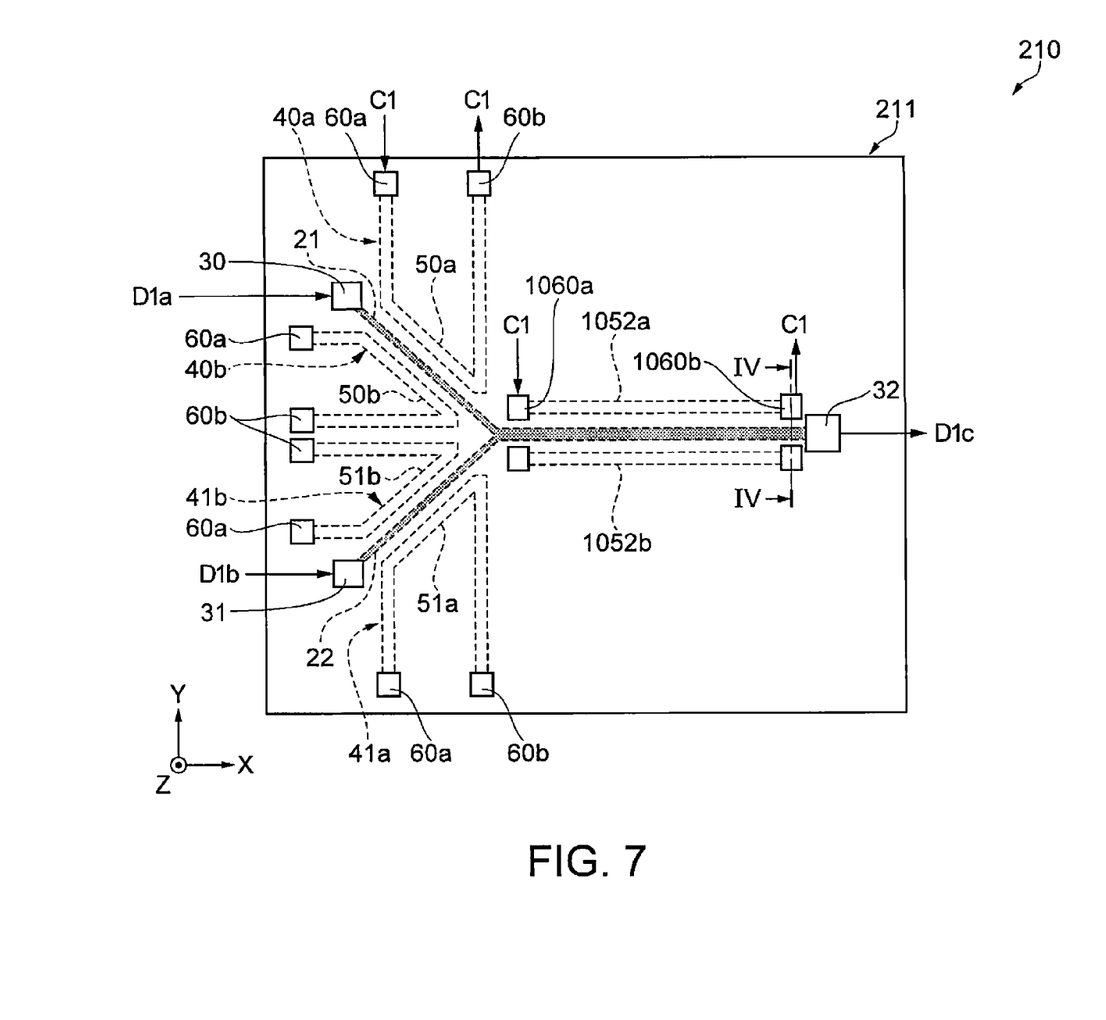
FIG. 7 is a plan view of a chemical synthesis device according to Modified Example 1.

FIG. 7 shows an arrangement of temperature control channels of a chemical synthesis device according to this modified example. As shown in FIG. 7, a chemical synthesis device 210 according to this modified example includes a substrate 211, a reagent injection device 30, a reagent injection device 31, a product removing device 32, a plurality of medium injection devices 60a and 1060a, and a plurality of medium removing devices 60b and 1060b. Temperature control channels 1052a and 1052b are formed inside the substrate 211, unlike the configuration of the substrate 11 of the first embodiment.

In the chemical synthesis device 210, the temperature control medium C1 is injected from the medium injection devices 60a and 1060a and is removed from the medium removing devices 60b and 1060b. The medium injection devices 1060a, the medium removing devices 1060b, and the temperature control channels 1052a and 1052b are disposed at positions along the synthesis channel portion 23, whereby it is possible to reduce the influence of the substrate 211 on the temperature control medium C1. Accordingly, the temperature of the temperature control medium C1 can be controlled more accurately.

Figure 8A:
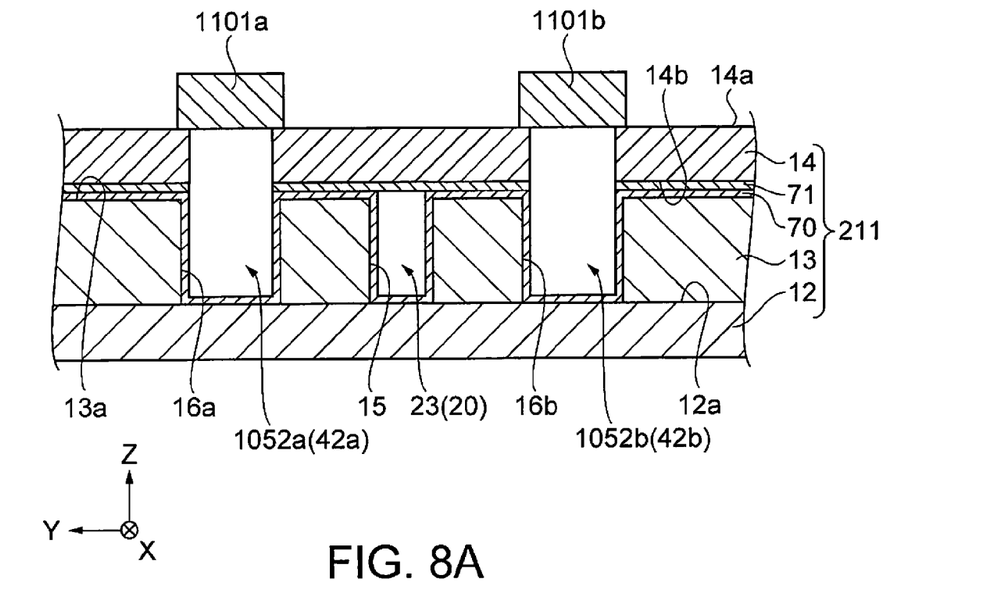
FIGS. 8A and 8B are cross-sectional views taken along line IV-IV in FIG. 7.
Figure 8B:
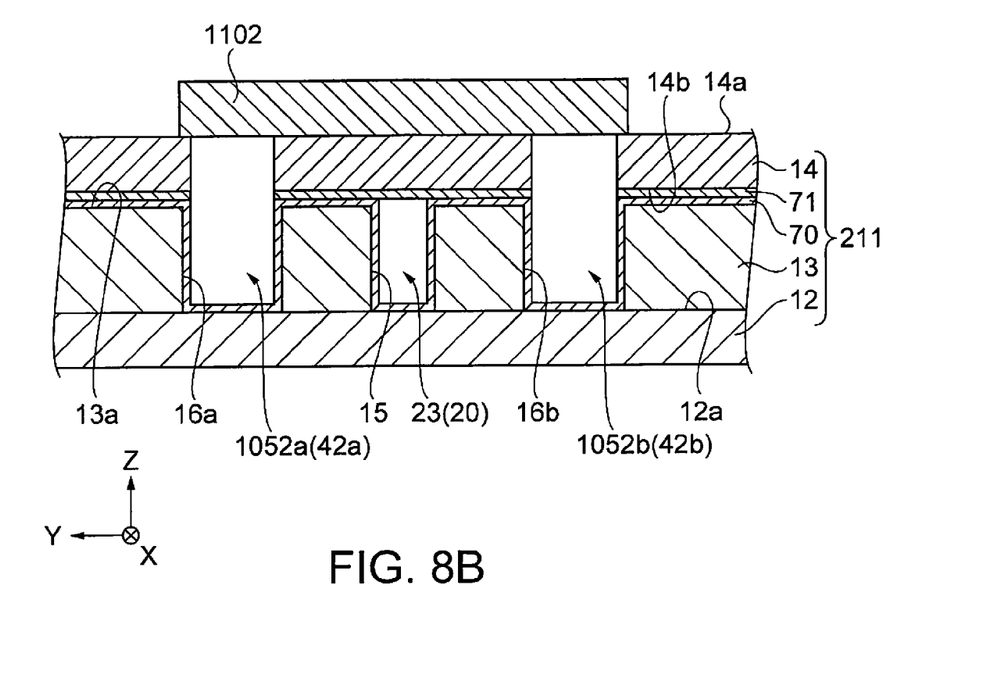

FIGS. 8A and 8B are cross-sectional views taken along line IV-IV in FIG. 7. As shown in FIG. 8A, as the medium removing devices 1060b of the chemical synthesis device 210, medium removing devices 1101a and 1101b are respectively provided for the temperature control channels 1052a and 1052b. However, as shown in FIG. 8B, a medium removing device 1102 common to the temperature control channels 1052a and 1052b may be provided.

Modified Example 2

Figure 9:
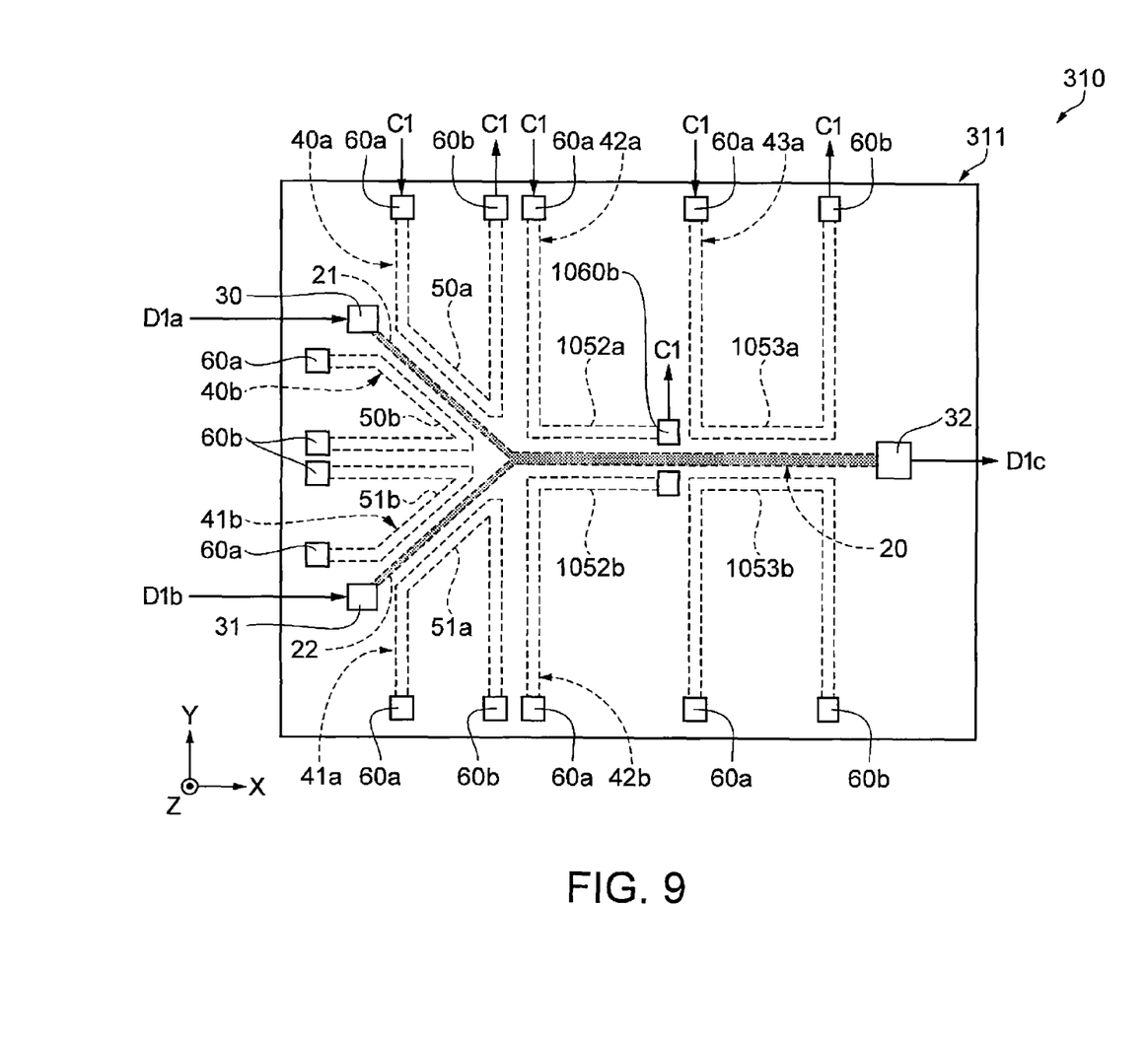
FIG. 9 is a plan view of a chemical synthesis device according to Modified Example 2.

FIG. 9 shows an arrangement of temperature control channels of a chemical synthesis device according to this modified example. As shown in FIG. 9, a chemical synthesis device 310 according to this modified example includes a substrate 311, a reagent injection device 30, a reagent injection device 31, a product removing device 32, a plurality of medium injection devices 60a, and a plurality of medium removing devices 60b and 1060b. Temperature control channels 1052a, 1052b, 1053a, and 1053b are formed inside the substrate 311, unlike the configuration of the substrate 11 of the first embodiment.

In the chemical synthesis device 310, the temperature control medium C1 is injected from the medium injection devices 60a and is removed from the medium removing devices 60b and 1060b. In this modified example, the temperature control channel along the synthesis channel portion 23 is constituted by two pairs of channels (temperature control channels 1052a and 1052b, and temperature control channels 1053a and 1053b). This makes it possible to separately control the temperatures of a first half and a second half of the flow in the synthesis channel portion 23. It should be noted that the medium removing device 1060b can be configured as shown in FIG. 8, in the same manner as Modified Example 1.

Such configurations and arrangements of the modified examples can also be used to provide the same effects as those of the embodiments.

Although the modified examples are made for the synthesis channel portion 23 of the chemical synthesis device 10, similar configurations are applicable to other channel portions. The invention is not limited to the embodiments and modified examples, and can be widely applied without departing from the spirit of the present invention.

What is claimed is:

1. A method for manufacturing a chemical synthesis device having a first channel in which a plurality of fluids are subjected to chemical synthesis, the method comprising:
    forming a pre-patterned layer and a side wall layer on a first substrate;
    forming, in the pre-patterned layer, a first through hole and a second through hole that penetrate the pre-patterned layer;
    forming a first protective film on a surface of the pre-patterned layer that remains after forming the first through hole and the second through hole and on an exposed surface of the first substrate; and attaching a surface of a second substrate provided with a second protective film on the second protective film side to a surface of the first substrate on the first protective film side, wherein the side wall layer is provided with a first through hole and a second through hole, the first through hole forms a portion of the first channel, at least a portion of the second through hole forms a portion of a second channel that is formed along the first channel and that is different from the first channel, and a medium for controlling a temperature of the fluids flowing through the first channel flows through the second channel.

2. The method for manufacturing a chemical synthesis device according to claim 1, wherein the second channel is formed so as to be constituted by a pair of channels sandwiching the first channel.

3. The method for manufacturing a chemical synthesis device according to claim 1, wherein the first channel includes a plurality of introduction channel portions from which the plurality of fluids are respectively introduced and a synthesis channel portion in which the plurality of fluids are subjected to synthesis, and the second channel includes a first control channel portion for controlling the temperature of the fluids flowing through the synthesis channel portion.

4. The method for manufacturing a chemical synthesis device according to claim 3, wherein the first control channel portion has a temperature maintaining portion for maintaining a temperature of a fluid resulting from chemical synthesis that flows through the synthesis channel portion at a predetermined temperature.

5. The method for manufacturing a chemical synthesis device according to claim 3, wherein the second channel includes a second control channel portion for controlling the temperature of the fluids flowing through the introduction channel portions.

6. The method for manufacturing a chemical synthesis device according to claim 1, wherein the width of the second channel is larger than the width of the first channel.

7. The method for manufacturing a chemical synthesis device according to claim 1, wherein wherein the medium is inert to the fluids flowing through the first channel.

* * * * *